United States Patent
Signorini et al.

(10) Patent No.: US 12,052,133 B2
(45) Date of Patent: Jul. 30, 2024

(54) BLOCKCHAIN-BASED NETWORK DEVICE MANAGEMENT METHODS AND DEVICES

(71) Applicant: Nokia Solutions and Networks Oy, Espoo (FI)

(72) Inventors: Matteo Signorini, Palaiseau (FR); Matteo Pontecorvi, Palaiseau (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 109 days.

(21) Appl. No.: 17/389,718

(22) Filed: Jul. 30, 2021

(65) Prior Publication Data

US 2022/0052909 A1    Feb. 17, 2022

(30) Foreign Application Priority Data

Aug. 17, 2020    (EP) .................................... 20191266

(51) Int. Cl.
*H04L 41/0659*    (2022.01)
*G06F 8/658*    (2018.01)
(Continued)

(52) U.S. Cl.
CPC .......... *H04L 41/0661* (2023.05); *G06F 8/658* (2018.02); *H04L 9/3239* (2013.01);
(Continued)

(58) Field of Classification Search
CPC ............... H04L 41/0661; H04L 41/082; H04L 43/0817; H04L 43/10; H04L 9/3239;
(Continued)

(56) References Cited

U.S. PATENT DOCUMENTS

| | | | |
|---|---|---|---|
| 10,659,473 B2 | 5/2020 | Signorini et al. | |
| 2011/0060822 A1* | 3/2011 | Fan | H04L 41/04 709/224 |

(Continued)

FOREIGN PATENT DOCUMENTS

| | | |
|---|---|---|
| CN | 109768954 A | 5/2019 |
| CN | 110460445 A | 11/2019 |

(Continued)

OTHER PUBLICATIONS

Lee et al., Blockchain-based secure firmware update for embedded devices in an Internet of Things environment, J Supercomput (2017) 73, pp. 1152-1167 (Year: 2017).*

(Continued)

*Primary Examiner* — Emmanuel L Moise
*Assistant Examiner* — Robert A Shaw
(74) *Attorney, Agent, or Firm* — Lippes Mathias LLP (57) ABSTRACT

An apparatus (101) is disclosed for remotely controlling a network device (102). The apparatus comprises means for determining (200) that said network device (102) is unresponsive; means for determining a patch for application at said network device (102) for resolving said unresponsiveness; means for sending (207) said patch to an intermediary device (103) capable of communicating with said network device (102); means for signing (208) a first transaction corresponding to said patch with a blockchain network (104), wherein said first transaction is a multi-signed transaction signed by said apparatus (101) and said intermediary device (103) and wherein said first transaction is indicative of a patch result to be obtained; and means for receiving (218) a message from said intermediary device (103) that said patch has been applied.

Also disclosed are a network device, an intermediary device, a blockchain network device and corresponding methods.

7 Claims, 5 Drawing Sheets

(51) Int. Cl.
  *H04L 9/00* (2022.01)
  *H04L 9/32* (2006.01)
  *H04L 9/40* (2022.01)
  *H04L 41/082* (2022.01)
  *H04L 43/0817* (2022.01)
  *H04L 43/10* (2022.01)

(52) U.S. Cl.
  CPC .............. *H04L 9/3255* (2013.01); *H04L 9/50* (2022.05); *H04L 41/082* (2013.01); *H04L 43/0817* (2013.01); *H04L 43/10* (2013.01); *H04L 63/12* (2013.01)

(58) Field of Classification Search
  CPC ......... H04L 9/3255; H04L 9/50; H04L 63/12; G06F 8/658
  See application file for complete search history.

(56) References Cited

U.S. PATENT DOCUMENTS

| | | | | |
|---|---|---|---|---|
| 2012/0246131 | A1* | 9/2012 | Semerdzhiev | G06F 16/325 707/E17.005 |
| 2013/0111566 | A1* | 5/2013 | Carley | H04L 63/18 726/4 |
| 2013/0326494 | A1* | 12/2013 | Nunez | G06F 8/65 717/172 |
| 2015/0178063 | A1* | 6/2015 | Narkinsky | G06F 8/658 717/168 |
| 2016/0337169 | A1* | 11/2016 | Chhabra | H04L 45/28 |
| 2017/0031676 | A1* | 2/2017 | Cecchetti | G06F 8/65 |
| 2018/0088928 | A1* | 3/2018 | Smith | H04L 9/3239 |
| 2018/0157481 | A1* | 6/2018 | Zessin | H04W 4/38 |
| 2018/0167217 | A1* | 6/2018 | Brady | H04L 67/10 |
| 2018/0176229 | A1* | 6/2018 | Bathen | H04L 9/3239 |
| 2018/0359096 | A1* | 12/2018 | Ford | H04L 9/3247 |
| 2019/0158470 | A1* | 5/2019 | Wright | G06Q 20/3678 |
| 2019/0163912 | A1* | 5/2019 | Kumar | H04L 9/0891 |
| 2019/0251199 | A1* | 8/2019 | Klianev | G06Q 40/04 |
| 2019/0372779 | A1 | 12/2019 | Monica et al. | |
| 2020/0057994 | A1 | 2/2020 | Hunn | |
| 2020/0067774 | A1* | 2/2020 | Saltsgaver | H04L 9/50 |
| 2020/0103894 | A1 | 4/2020 | Cella et al. | |
| 2020/0286087 | A1* | 9/2020 | Ma | G06Q 20/3825 |
| 2020/0329124 | A1* | 10/2020 | Zhou | H04L 9/0891 |
| 2020/0409687 | A1* | 12/2020 | Rouland | H04L 9/3239 |
| 2021/0067536 | A1* | 3/2021 | Mylrea | H04L 9/3239 |
| 2022/0147999 | A1* | 5/2022 | Luo | G06F 16/2379 |

FOREIGN PATENT DOCUMENTS

| | | | | |
|---|---|---|---|---|
| CN | 110798331 | A * | 2/2020 | ........... H04L 41/082 |
| EP | 2541836 | A1 * | 1/2013 | ......... H04L 12/2898 |
| EP | 2541836 | A1 | 1/2013 | |
| EP | 3484119 | A1 | 5/2019 | |
| EP | 3575953 | A1 * | 12/2019 | |
| EP | 3575953 | A1 | 12/2019 | |
| EP | 3582439 | A1 * | 12/2019 | .............. G06F 8/65 |
| GB | 2595216 | A * | 11/2021 | ............. H04L 12/28 |
| WO | WO-2013000936 | A1 * | 1/2013 | ......... H04L 12/2898 |
| WO | WO-2017187397 | A1 * | 11/2017 | ............... A01K 5/02 |
| WO | WO-2019108436 | A1 * | 6/2019 | ......... G06F 16/1834 |
| WO | WO-2019190394 | A1 * | 10/2019 | .......... G06F 21/577 |
| WO | 2019/218055 | A1 | 11/2019 | |
| WO | 2020/157369 | A1 | 8/2020 | |

OTHER PUBLICATIONS

Boudguiga et al., Towards Better Availability and Accountability for IoT Updates by means of a Blockchain, 2017 IEEE European Symposium on Security and Privacy Workshops (EuroS&PW) (Year: 2017).*

Nikitin et al., Chainiac: Proactive Software-Update Transparency via Collectively Signed Skipchains and Verified Builds, 26th USENIX Security Symposium, 2017 pp. 1271-1287 (Year: 2017).*

Fernández-Caramés et al. "A Review on the Use of Blockchain for the Internet of Thing", IEEE Access, vol. 6, 2018, pp. 32979-33001.

Extended European Search Report received for corresponding European Patent Application No. 20191266.4, dated Dec. 14, 2020, 8 pages.

Nikitin et al., "Chainiac: Proactive Software-Update Transparency via Collectively Signed Skipchains and Verified Builds", 26th USENIX Security Symposium, 2017, 18 pages.

Leiba et al., "Incentivized Delivery Network of IoT Software Updates Based on Trustless Proof-of-Distribution", IEEE European Symposium on Security and Privacy Workshops (EuroS&PW), Apr. 23-27, 2018, pp. 29-39.

* cited by examiner

BLOCKCHAIN-BASED NETWORK DEVICE MANAGEMENT METHODS AND DEVICES

TECHNICAL FIELD

Blockchain-based network device management methods and devices are described. The management methods may be used for example for the recovery of an unresponsive network device in a communication network.

BACKGROUND

In a network, certain devices may require updates and configuration changes. Such changes need to be implemented in a secure, verifiable manner in the sense that they should only be made by an authorized party. A third party, with or without malicious intentions, should not be able to carry out such changes. Blockchains may be used in such a context.

SUMMARY

The embodiments, examples and features, if any, described in this specification that do not fall under the scope of the protection are to be interpreted as examples useful for understanding the various embodiments or examples that fall under the scope of protection.

One or more exemplary embodiments concern a method for managing a network device, said method comprising, at an apparatus configured to remotely control said network device:
  determining that said network device is unresponsive;
  determining a patch for application at said network device for resolving said unresponsiveness;
  sending said patch to an intermediary device capable of communicating with said network device;
  signing a first transaction corresponding to said patch with a blockchain network, wherein said first transaction is a multi-signed transaction signed by said apparatus and said intermediary device and wherein said first transaction is indicative of a patch result to be obtained;
  receiving a message from said intermediary device that said patch has been applied.

According to an exemplary embodiment, the method further comprises, prior to sending said patch to said intermediary device:
  sending at least one status check operation to be carried out at the network device (102) to said intermediary device;
  obtaining a result of said at least one status check operation from said intermediary device;
  determining at least part of said patch as a function of said result.

According to an exemplary embodiment, the first transaction comprises:
  an identifier of said apparatus;
  an identifier of said intermediate device;
  an identifier of said network device;
  a hash of said patch;
  a hash of data descriptive of an expected outcome of said patch.

According to an exemplary embodiment, the method further comprises, obtaining first status information of said connected device from said blockchain;
  obtaining second status information of said connected device from said connected device;
  determining a successful recovery when said first status and said second status information match.

One or more exemplary embodiments concern method for managing a network device, the method comprising, at said network device:
  receiving a patch from an intermediary device;
  verifying safety of said patch, and in case said patch is deemed safe, applying said patch;
  signing a second transaction corresponding to said patch with a blockchain network, wherein said second transaction is a multi-signed transaction signed by said network device and said intermediary device and wherein said second transaction comprises information indicative of a report of said patch application.

According to an embodiment, the second transaction comprises:
  an identifier of said apparatus;
  an identifier of said intermediate device;
  an identifier of said network device (102);
  a hash of said patch;
  a hash of data descriptive of an actual outcome of said patch.

According to an embodiment, verifying said patch comprises:
  verifying an identity of said intermediary device, by checking that said identity of said intermediary device stored in a first transaction stored in the blockchain linked to said second transaction is the same as the identity of said intermediary device said network device receives the patch from;
  verifying that a hash of the patch received from said intermediary device is the same as a hash stored in said first transaction for that patch;
  verifying that an own identity of said network device is the same as an identity of a device to be patched stored in said first transaction;
  verifying whether an apparatus that provided the patch and indicated in the blockchain in said first transaction is a trusted device and/or whether the network device is allowed to receive a patch from said apparatus.

According to an embodiment, the method further comprises, prior to receiving said patch, obtaining at least one status check operation from said intermediary device, carrying out said at least one check operation and reporting results of said at least one check operation to said intermediary device.

One or more embodiments concern a method for managing a network device, said method comprising, at intermediary device:
  receiving a patch from an apparatus configured to remotely control said network device;
  signing a first transaction corresponding to said patch with a blockchain network, wherein said first transaction is a multi-signed transaction also signed by said apparatus and wherein said first transaction is indicative of a patch result to be obtained;
  providing said patch to said network device for application by said network device;
  signing a second transaction corresponding to said patch with a blockchain network, wherein said second transaction is a multi-signed transaction signed also by said network device and wherein said second transaction comprises information indicative of a report of said patch application;
  providing, to the apparatus, a message indicative of the application of the patch.

According to an embodiment, the method further comprises, prior to receiving said patch:
- obtaining (203), from said apparatus (101), at least one status check operation to be carried out at the network device (102);
- collecting (205) status data from said network device (102) corresponding to said at least one status check operation;
- providing (206) said status data to said apparatus (101).

One or more exemplary embodiments concern a method in a system comprising an apparatus for providing a patch to a network device through an intermediary device, comprising, at a device part of a blockchain network:
- receiving a first transaction comprising an identifier of said apparatus, an identifier of said intermediate device, an identifier of said network device, a hash of said patch, a hash of data descriptive of an expected outcome of said patch;
- validating said first transaction, comprising verifying that said first transaction is signed by both said apparatus and said intermediary device;
- in case said validation of the first transaction is positive, adding said first transaction to a blockchain.

According to an exemplary embodiment, the method further comprises
- receiving a second transaction comprising an identifier of said apparatus, an identifier of said intermediate device, an identifier of said network device, a hash of said patch, a hash of data descriptive of an actual outcome of said patch, a pointer to said first transaction;
- validating said second transaction, comprising:
  - verifying that said second transaction is signed by both said intermediary device and said network device; and
  - verifying that said hash of data descriptive of an actual outcome of said patch is equal to said hash of data descriptive of an expected outcome of said patch;
- in case said validation of the second transaction is positive, adding said second transaction to said blockchain.

One or more exemplary embodiments concern an apparatus for remotely controlling a network device, comprising
- means for determining that said network device is unresponsive;
- means for determining a patch for application at said network device for resolving said unresponsiveness;
- means for sending said patch to an intermediary device capable of communicating with said network device;
- means for signing a first transaction corresponding to said patch with a blockchain network, wherein said first transaction is a multi-signed transaction signed by said apparatus and said intermediary device and wherein said first transaction is indicative of a patch result to be obtained;
- means for receiving a message from said intermediary device that said patch has been applied.

According to an exemplary embodiment, the apparatus further comprises
- means for sending, prior to sending said patch to said intermediary device, at least one status check operation to be carried out at the network device to said intermediary device;
- means for obtaining, prior to sending said patch to said intermediary device, a result of said at least one status check operation from said intermediary device;
- means for determining, prior to sending said patch to said intermediary device, said patch as a function of said result.

According to an exemplary embodiment, the apparatus further comprises at least one processor and at least one memory including computer code configured to, with the at least one processor, cause the apparatus to generate said first transaction comprising:
- an identifier of said apparatus;
- an identifier of said intermediate device;
- an identifier of said network device;
- a hash of said patch;
- a hash of data descriptive of an expected outcome of said patch.

According to an exemplary embodiment, the apparatus further comprises
- means for obtaining first status information of said connected device from said blockchain network based on a second transaction linked to said first transaction;
- means for obtaining second status information of said connected device from said connected device;
- means for determining a successful recovery when said first status and said second status information match.

One or more exemplary embodiments concern a network device comprising:
- means for receiving a patch from an intermediary device;
- means for verifying safety of said patch, and in case said patch is deemed safe, applying said patch;
- means for signing a second transaction corresponding to said patch with a blockchain network, wherein said second transaction is a multi-signed transaction signed by said network device and said intermediary device and wherein said second transaction comprises information indicative of a report of said patch application.

According to an exemplary embodiment, the network device comprises at least one processor and at least one memory including computer code configured to, with the at least one processor, cause the apparatus to generate said second transaction comprising:
- an identifier of said apparatus;
- an identifier of said intermediate device;
- an identifier of said network device;
- a hash of said patch;
- a hash of data descriptive of an actual outcome of said patch.

According to an exemplary embodiment, the network device comprises means for verifying said patch by:
- verifying an identity of said intermediary device, by checking that said identity of said intermediary device stored in a first transaction stored in the blockchain linked to said second transaction is the same as the identity of said intermediary device said network device receives the patch from;
- verifying that a hash of the patch received from said intermediary device is the same as a hash stored in said first transaction for that patch;
- verifying that an own identity of said network device is the same as an identity of a device to be patched stored in said first transaction;
- verifying whether an apparatus that provided the patch and indicated in the blockchain in said first transaction is a trusted device and/or whether the network device is allowed to receive a patch from said apparatus.

According to an exemplary embodiment, the network device comprises means for obtaining at least one status check operation from said intermediary device, and means for carrying out said at least one check operation and means for reporting results of said at least one check operation to said intermediary device.

One or more exemplary embodiments concern an intermediary device comprising
- means for receiving a patch from an apparatus configured to remotely control a network device;
- means for signing a first transaction corresponding to said patch with a blockchain network, wherein said first transaction is a multi-signed transaction also signed by said apparatus and wherein said first transaction is indicative of a patch result to be obtained;
- means for providing said patch to said network device for application by said network device;
- means for signing a second transaction corresponding to said patch with a blockchain network, wherein said second transaction is a multi-signed transaction signed also by said network device and wherein said second transaction comprises information indicative of a report of said patch application;
- means for providing, to the apparatus, a message indicative of the application of the patch.

According to an exemplary embodiment, the intermediary device comprises means for obtaining, from said apparatus, at least one status check operation to be carried out at the network device;
- means for collecting status data from said network device corresponding to said at least one status check operation;
- means for providing said status data to said apparatus.

One or more exemplary embodiments concern a blockchain network device for use in a system comprising an apparatus for providing a patch to a network device through an intermediary device, said blockchain network device comprising:
- means for receiving a first transaction comprising an identifier of said apparatus, an identifier of said intermediate device, an identifier of said network device, a hash of said patch, a hash of data descriptive of an expected outcome of said patch;
- means for validating said first transaction, comprising verifying that said first transaction is signed by both said apparatus and said intermediary device and, in case said validation of the first transaction is positive, for adding said first transaction to a blockchain.

According to an exemplary embodiment, the blockchain network device further comprises means for receiving a second transaction comprising an identifier of said apparatus, an identifier of said intermediate device, an identifier of said network device, a hash of said patch, a hash of data descriptive of an actual outcome of said patch, a pointer to said first transaction; and
- means for validating said second transaction, wherein validating comprises:
  - verifying that said second transaction is signed by both said intermediary device and said network device; and
  - verifying that said hash of data descriptive of an actual outcome of said patch is equal to said hash of data descriptive of an expected outcome of said patch and, in case said validation of the second transaction is positive, adding said second transaction to said blockchain.

At least one other exemplary embodiment provides an apparatus comprising at least one processor and at least one memory including computer program code. The at least one memory and the computer program code are configured to, with the at least one processor, to cause the apparatus to at least perform, in view of remotely controlling a network device:
- determining that said network device is unresponsive;
- determining a patch for application at said network device for resolving said unresponsiveness;
- sending said patch to an intermediary device capable of communicating with said network device;
- signing a first transaction corresponding to said patch with a blockchain network, wherein said first transaction is a multi-signed transaction signed by said apparatus and said intermediary device and wherein said first transaction is indicative of a patch result to be obtained;
- receiving a message from said intermediary device that said patch has been applied.

At least one other exemplary embodiment provides a network device comprising at least one processor and at least one memory including computer program code. The at least one memory and the computer program code are configured to, with the at least one processor, to cause the network device to at least perform:
- receiving a patch from an intermediary device;
- verifying safety of said patch, and in case said patch is deemed safe, applying said patch;
- signing a second transaction corresponding to said patch with a blockchain network, wherein said second transaction is a multi-signed transaction signed by said network device and said intermediary device and wherein said second transaction comprises information indicative of a report of said patch application.

At least one other exemplary embodiment provides an intermediary device comprising at least one processor and at least one memory including computer program code. The at least one memory and the computer program code are configured to, with the at least one processor, to cause the intermediary device to at least perform:
- receiving a patch from an apparatus configured to remotely control a network device;
- signing a first transaction corresponding to said patch with a blockchain network, wherein said first transaction is a multi-signed transaction also signed by said apparatus and wherein said first transaction is indicative of a patch result to be obtained;
- providing said patch to said network device for application by said network device;
- signing a second transaction corresponding to said patch with a blockchain network, wherein said second transaction is a multi-signed transaction signed also by said network device and wherein said second transaction comprises information indicative of a report of said patch application;
- providing, to the apparatus, a message indicative of the application of the patch.

Generally, in the apparatus, network device and intermediary device mentioned above, the at least one memory and the computer program code are configured to, with the at least one processor of these devices, to cause these devices to perform one or more or all steps of the methods disclosed herein.

At least one other exemplary embodiment provides a blockchain network device comprising at least one processor and at least one memory including computer program code. The at least one memory and the computer program code are configured to, with the at least one processor, to cause the blockchain network device to at least perform, in a system comprising an apparatus for providing a patch to a network device through an intermediary device:
- receiving a first transaction comprising an identifier of said apparatus, an identifier of said intermediate device, an identifier of said network device, a hash of said patch, a hash of data descriptive of an expected outcome of said patch;

validating said first transaction, comprising verifying that said first transaction is signed by both said apparatus and said intermediary device; and in case said validation of the first transaction is positive, adding said first transaction to a blockchain.

At least one other exemplary embodiment provides a blockchain network device comprising at least one processor and at least one memory including computer program code. The at least one memory and the computer program code are configured to, with the at least one processor, to cause the blockchain network device to at least perform, in a system comprising an apparatus for providing a patch to a network device through an intermediary device:

receiving a second transaction comprising an identifier of said apparatus, an identifier of said intermediate device, an identifier of said network device, a hash of said patch, a hash of data descriptive of an actual outcome of said patch, a pointer to said first transaction; and validating said second transaction, wherein validating comprises:

verifying that said second transaction is signed by both said intermediary device and said network device; and verifying that said hash of data descriptive of an actual outcome of said patch is equal to said hash of data descriptive of an expected outcome of said patch and, in case said validation of the second transaction is positive, adding said second transaction to said blockchain.

At least one example embodiment provides a non-transitory computer-readable medium storing computer-executable instructions that, when executed by at least one processor at an apparatus, a network device, an intermediary device or a blockchain network device, cause the devices to perform one or more or all steps of a method described herein.

BRIEF DESCRIPTION OF THE DRAWINGS

Example embodiments will be more fully understood from the detailed description given herein below and the accompanying drawings, which are given by way of illustration only.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various exemplary embodiments will now be described more fully with reference to the accompanying drawings. However, specific structural and functional details disclosed herein are merely representative for purposes of describing example embodiments. The exemplary embodiments may be embodied in many alternate forms and should not be construed as limited to only the embodiments set forth herein. It should be understood that there is no intent to limit example embodiments to the particular forms disclosed.

It should be appreciated by those skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may be any physical media that can be read, written or more generally accessed by a computer/a processing device. Examples of computer storage media include, but are not limited to, a flash drive or other flash memory devices (e.g. memory keys, memory sticks, USB key drive), CD-ROM or other optical storage, DVD, magnetic disk storage or other magnetic storage devices, solid state memory, memory chip, RAM, ROM, EEPROM, smart cards, a relational database management system, a traditional database, or any other suitable medium that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, SQL, MySQL, HTML, PHP, Python, Java, Javascript, etc. Embodiments of a computer-readable medium include, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more integrated circuits or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 1:
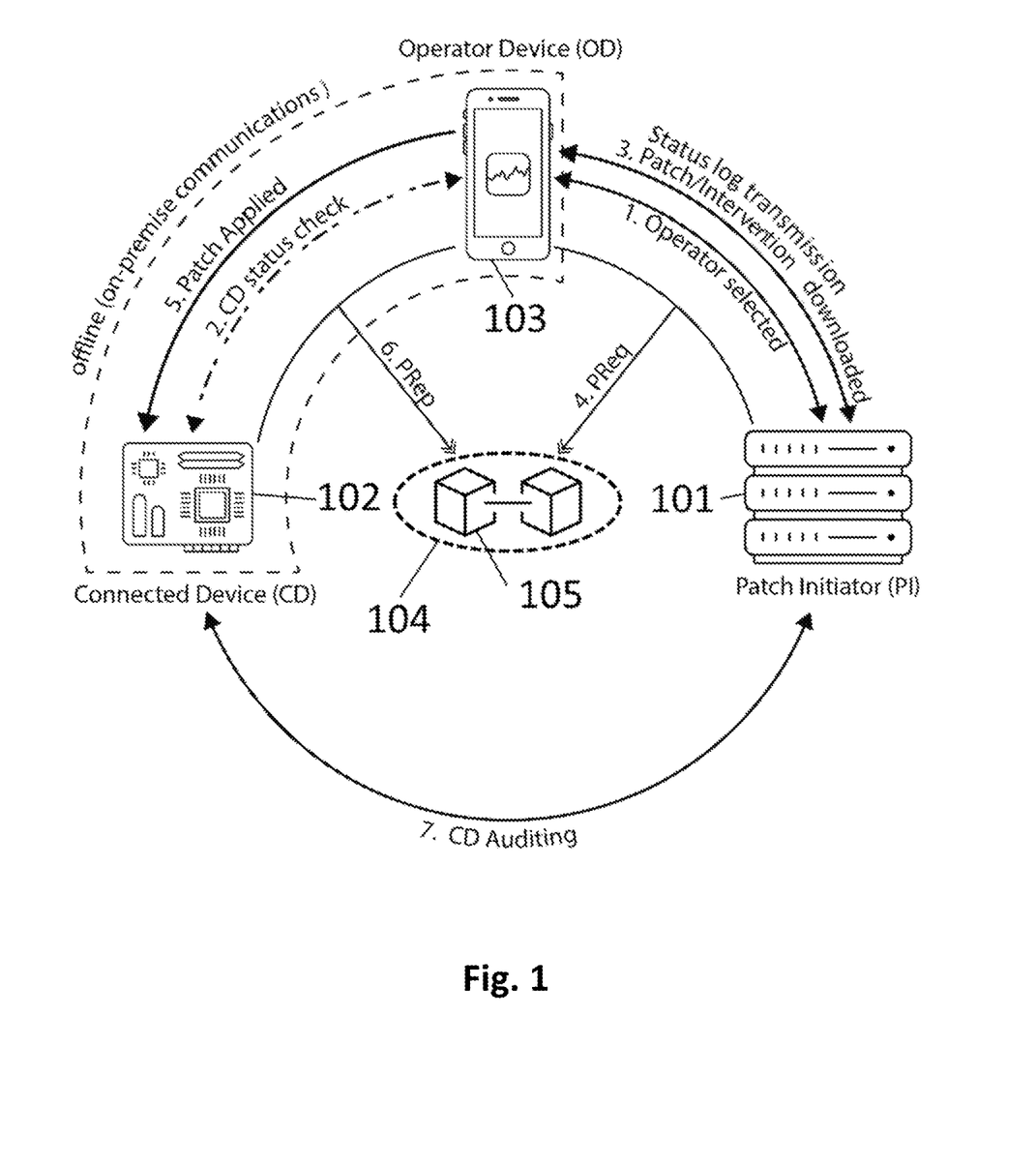
FIG. 1 is a diagram of a system according to an exemplary embodiment.

FIG. 1 is a block diagram of an example system in which an exemplary embodiment may be implemented. The system comprises a remote device called a patch initiator PI 101, a network device called connected device CD 102, an operator device OD 103 and a blockchain network BN 104. Single digit numbers indicate certain steps of the communication between the different entities according to an exemplary embodiment. While the four entities 101 to 104 are shown as single devices in FIG. 1, the network may comprise more than one of each device, e.g. to provide the required resources when scaling the network.

In the system of FIG. 1, network devices such as but not limited to the connected device 102 are managed by the patch initiator 101. The connected device 102 can for example be updated and/or configured ('patched') by the patch initiator 101. A patch can, for example, comprise a change to a file system, a data base, any data structure, system configuration or software update. Purely as a non-limiting example, a patch could consist in a network interface configuration file in a Linux system in case the original configuration file was changed and does not allow the connected device to connect to the internet anymore.

According to an exemplary embodiment, the patch initiator may be any kind of network device, for example a server, a computer, or any other device capable of and configured to carry out the tasks described herein.

According to an exemplary embodiment, the connected device may be any kind of network device, typically including but not limited to a portable device such as a smart phone, a cellular phone or a wearable device, a tablet, a computer, a server, an Internet of Things (IoT) device, a personal digital assistant . . . or any other device connected to the network that may need to be updated and/or configured. According to an exemplary embodiment, connected device 102 contains an agent, which may be a software component, for understanding and applying changes required by a patch initiator and for communicating with the operator device 103 and the blockchain network 104, as described later.

According to an exemplary embodiment, the operator device 103 is a device that can connect to the connected device, either through a physical connection such as a cable (e.g. using an interface such as USB), or a wireless interface (e.g. based on IEEE 802.11) or another type of communication link. As a matter of example, the operator device 103 may be one among a smartphone, a tablet, a laptop computer.

Blockchain network 104 is a network of computers or servers or other processing devices which store and process a blockchain dataset. As is well known, a blockchain is a distributed ledger of transactions linked through cryptography recorded in a verifiable manner. Each block contains a cryptographic hash of the previous block, a timestamp, a nonce ('number used only once') and the transaction data. A common protocol among the devices of the blockchain network specifies how a new block is created and validated.

The data in any given block cannot be changed without changing the data in all subsequent blocks. Various devices of the blockchain network store copies of the blockchain and a consensus protocol is used to keep the copies synchronized.

According to an exemplary embodiment, transactions that are recorded in the blockchain comprise patch requests ('PReq') and patch reports ('PRep'). A patch request contains an expected result of the patch process, which may include for example the changes mentioned previously. A patch report contains a result of the patch process. The changes indicated in the PReq and in the PRep should match in case a patch was correctly applied.

A two-way handshake protocol for a blockchain based integrity protection system can be implemented to allow the patch initiator to send a patch to connected device 102. For that purpose, a patch request (PReq) is sent by the patch initiator to the blockchain network. The PReq is signed by the patch initiator. Once the patch request is validated by the blockchain network (i.e. a block with the patch request as transaction has been added to the blockchain and the patch initiator can obtain validation confirmation), the patch initiator sends the corresponding patch to the connected device to be patched. The connected device checks whether the patch it receives is the one for which a patch request was recorded in the blockchain.

According to an exemplary embodiment, the application of the patch by the connected device may comprise creation of two instances of the data or software to be patched. The patching process is carried out on the second instance to determine that the patch is safe. A patch report (PRep) is generated by the connected device, signed by the connected device and sent to the blockchain network for validation. Validation includes matching a hash of the PRep with a hash of the corresponding PReq. Both PRep and PReq are linked within the blockchain. Such a link may be implemented by inserting a hash of the PReq into the PRep (labeled 'Transaction Dependency Hash' in FIG. 4). The connected device waits for the validation of the patch report by the blockchain network to delete the second instance and apply the patch, now labeled as safe, to the first instance. According to an exemplary embodiment, an audit may be run (e.g. by the patch initiator) to determine whether the patch installed on the connected device is the one that was intended.

In certain cases, the patch initiator 101 may be unable to reach the connected device 102 in the sense that the connected device is unresponsive. Causes for the connected device being unresponsive may vary—the connected device may have been compromised by a malicious or an honest user, device behavior may be faulty, e.g. the agent within the connected device 102 may not function properly, the connected device may have been misconfigured and may not respond to the changes to be made, a network link between the patch initiator and the connected device may have been severed, or the connected device may simply refuse to response or be offline. Other reasons may exist. In such a case, transactions generated by the patch initiator, accepted and mined within the blockchain and sent off-chain to the connected device may have not have the desired effect.

The patch initiator determines whether the connected device is unresponsive and initiates a three-way handshake protocol, involving the connected device 102 and the operator device 103.

According to an exemplary embodiment, in a first step, as illustrated in FIG. 1, an operator device 103 is determined—the operator device 103 acts as an intermediary between the patch initiator 101 and the connected device 102. For example, a patch initiator may obtain a list (or already have stored a list) of operators which may for example belong to either the customer (i.e. in possession of the connected device 102) or a service provider. An operator device 103 is associated with each operator. Patch initiator and operator device identities (e.g. public keys) are signed by either the customer or the service provider and can thus easily be verified. This prevents fake operators from downloading patches generated by patch initiators, or patch initiators from applying malicious patches. Once the patch initiator has selected an operator device, it sends information concerning the connected device to be patched to this operator device. This information may include data enabling identification of the connected device 102 (such as an identifier) and may also contain information on how to reach it (e.g. a physical location of the device, or information on how to reach it through a network connection, such as an appropriate address).

According to a variant embodiment, the information also includes data descriptive of the connected device's connectivity and/or interfacing resources (e.g. its physical and/or wireless interfaces, user interface specifications and/or controls, software versions etc . . . ).

The patch initiator 101 also sends information which enable the operator device 103 to generate connected device status data. This information may comprise at least one among: one or more procedures to be applied to or by the connected device 102, one or more commands to be executed on or by the connected device 102, one or more scripts to be launched on or by the connected device, one or more auditing queries to be performed, other data enabling generation of status information. The information may require one or more among: manual intervention by the operator, automatic execution carried out by the operator device 103.

According to a variant embodiment, a single operator device 102 may receive information from a plurality of patch initiators 101.

According to a variant embodiment, a single operator device may receive target connected device identities and status check information for more than one connected device.

According to an exemplary embodiment, in a second step, the operator initiates a connected device status check. For that purpose the operator may physically connect the operator device 103 to the connected device 102. The operator device 103 may also connect to the connected device 102 through other means, such as a network. The operator then proceeds with carrying out the actions based on the information previously received from the patch initiator 101. According to an exemplary embodiment, the operator device 103 automatically sends at least one script or status check software to the connected device, which runs that script or the status check software, generates status data and transmits the status data to the operator device. According to a variant embodiment, the operator device is connected—or connects—to a plurality of connected devices for retrieving data descriptive of the status of each of the connected devices.

The output of this step is data descriptive of the connected device's status, which according to an exemplary embodiment may take the form of a log file produced by the connected device. According to a variant embodiment, a log file is produced by the operator device based on connected device feedback data. According to a variant embodiment, the data descriptive of the connected device's status comprises at least one among one or more notes and feedback data from the operator, with the operator entering this data on the operator device.

According to an exemplary embodiment, in a third step, the data descriptive of the connected device status is communicated by the operator device 103 to the patch initiator 101. The patch initiator analyzes the data descriptive of the connected device's status. Based on that analysis, the patch initiator creates or otherwise obtains a patch to be deployed and executed on the target connected device 103. The patch is sent by the patch initiator 102 to the operator device 103.

According to an exemplary embodiment, a patch can contain any operation or set of operations that the operator is expected to execute on the target connected device using the operator device. This operation or set of operations may, for example, be coded as a piece of software or firmware, and/or a list of commands, and/or at least one script. The patch is signed by the patch initiator 102 so that another device or entity can verify its authenticity and integrity. This also prevents an unknown or untrusted patch initiator from generating a possibly malicious patch.

According to a variant embodiment, a patch may also comprise at least one procedure to be applied to the connected device. The procedure may be carried out by the operator.

According to an exemplary embodiment, in a fourth step, a patch request PReq representative of the patch is stored in the blockchain data structure using a multi-signature transaction. A multi-signature transaction (also called 'multisig' transaction) is a transaction that has to be signed by more than one entity. According to an exemplary embodiment, the PReq transaction, initiated by the patch initiator, is signed by the patch initiator 101 and the operator device 103. Signature by the patch initiator, respectively the operator device, provides protection from repudiation by the patch initiator, respectively the operator device. The multi-signature transaction also prevents a malicious entity from creating fake patches for installation on a target connected device. The blockchain network 104 transmits acknowledgments to both the patch initiator 101 and the operator device 103. The operator can then start deployment of the patch at the connected device 102.

According to an exemplary embodiment, in a fifth step, the operator device 103 connects to the connected device 101 and the patch is applied.

According to an exemplary embodiment, applying a patch may comprise executing one or more procedures and/or software modules obtained from the patch initiator 101 on the connected device 102 and/or changing settings and/or parameters of the connected device.

According to an exemplary embodiment, the connected device 102 performs a safety check before applying a patch. Prior to these checks, the connected device receives from the operator device a reference to the transaction within the blockchain containing the PReq for the patch to be applied.

a. The connected device 102 verifies the identity of the operator device, e.g. by checking that the identity of the operator device stored in the PReq in the blockchain is the same as the identity of the operator device it receives the patch from. This is done by verifying that the PReq transaction has been signed by the operator device.

b. The connected device checks that the patch has not been tampered with by verifying that the hash of the patch received from the operator device is the same as the hash stored in the blockchain for that patch.

c. The connected device checks that its own identity corresponds to the identity of the connected device to be patched present in the PReq in the blockchain. For this purpose, the PReq transaction contains an ID of the connected device (called 'Target Device/Class ID' in FIG. 4).

d. The connected device checks whether the patch initiator 101 indicated in the blockchain PReq transaction is a trusted device and/or whether the connected device is allowed to receive a patch from that specific patch initiator.

According to a variant embodiment, the connected device checks that the operator device it receives the patch from is a trusted device, in which case the above steps are not necessary.

According to an exemplary embodiment, in a sixth step, once the patch has been applied, the connected device 102 generates data descriptive of the patching process results, e.g. in the form of a log, and makes it available to the operator device 103. The data is adapted to allow the operator device to determine whether the patching process was successful. The connected device, which now functions again, generates a patch report PRep transaction to be added to the blockchain. This PRep transaction is multi-signed by both the operator device 103 and the connected device 102. The double signature is a prerequisite for the blockchain transaction to be accepted. As previously indicated, the PRep contains a hash of data descriptive of a list of operations that were executed within the connected device during application of the patch. This hash is normally identical to the hash of data of the expected patch operations in the patch request PReq.

According to an exemplary embodiment, in a seventh step, a network device, which may be the patch initiator 101, can perform an audit of the connected device 102 to verify that a patch has been correctly applied.

Figure 2A:
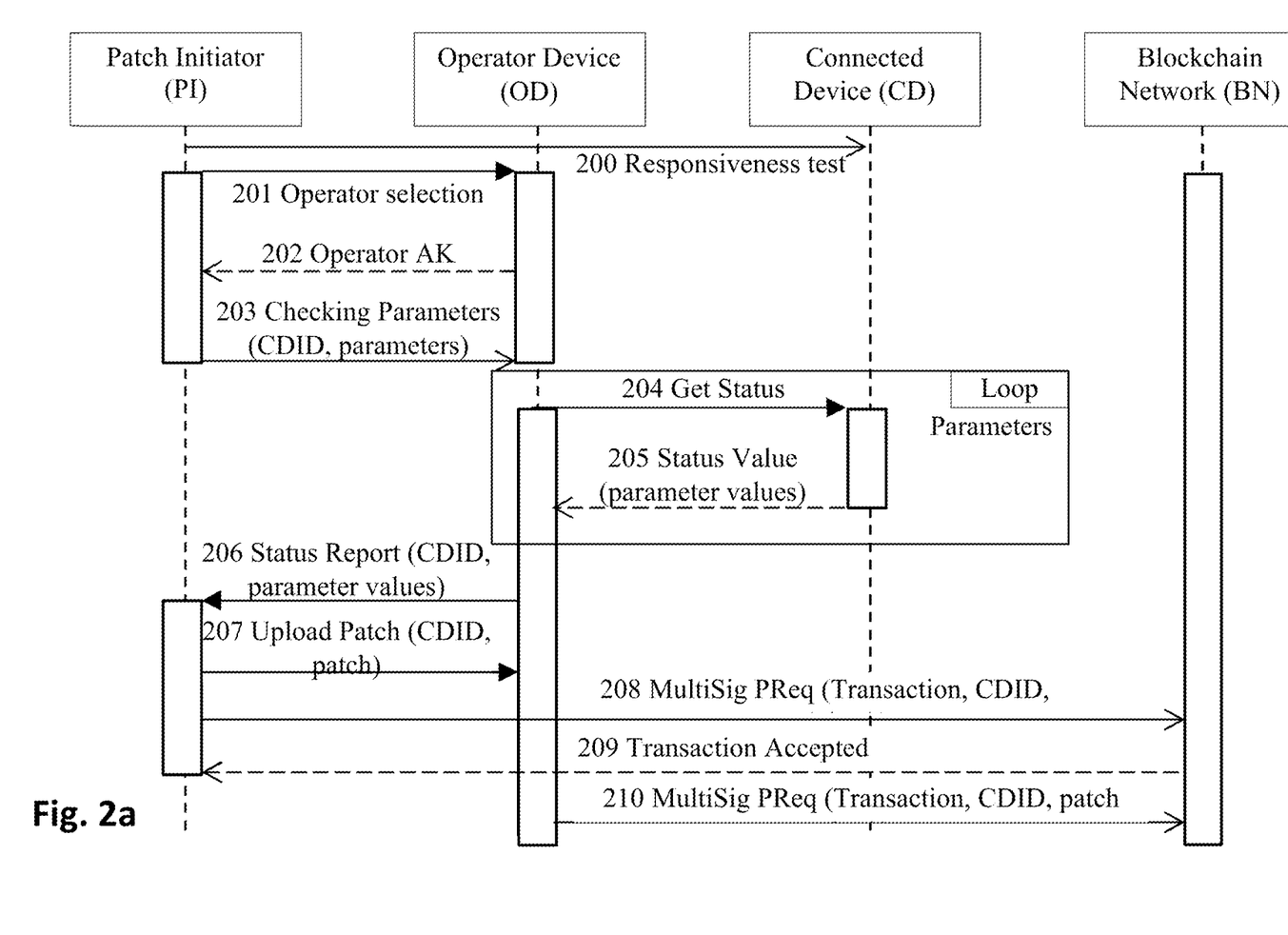
FIG. 2a is the first part of a flow sequence diagram according to an exemplary embodiment.
Figure 2B:
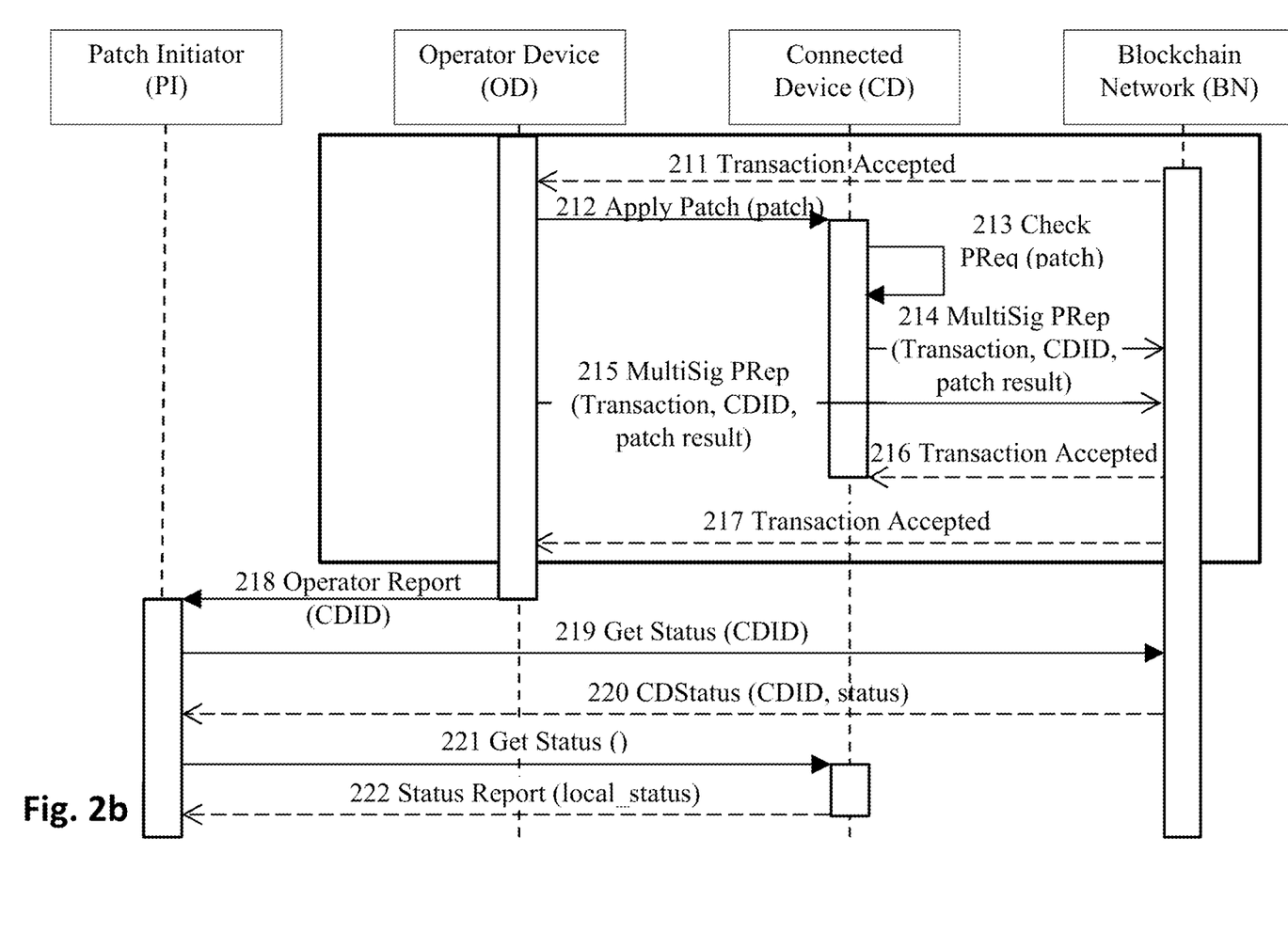
FIG. 2b is the second part of a flow sequence diagram according to an exemplary embodiment.

FIGS. 2a and 2b represent detailed flow sequences between the patch initiator, the operator device, the connected device and the blockchain network according to an exemplary embodiment.

In a step 200, the patch initiator determines that the connected device is unresponsive. According to an exemplary embodiment, the patch initiator sends a message to the connected device. For example after a timeout, the patch initiator concludes that the connected device is unresponsive.

In a step 201, the patch initiator sends a message to the operator device that it selected and which will be given the rights to recover, i.e. patch a remote connected device that is unresponsive and/or behaving as if being offline, or which crashed, or has a faulty behavior. In a step 202, the operator device marks its engagement in an acknowledge message. Once the operator device is engaged, in a step 203, the patch initiator sends the information which enable the operator device 103 to generate connected device status data, e.g. as previously defined, called 'parameters' in FIG. 2a, and the identification information of the connected device to be recovered and/or fixed.

In a step 204, the operator device transmits the information for generating status data to the connected device and obtains data descriptive of the connected device's status, e.g. parameter values, in return, in a step 205. Steps 204 and 205 loop until all required checks have been made and parameters obtained. In a step 206, the status information is sent to the patch initiator by the operator device, giving the patch initiator an overview of the status of the connected device.

The patch initiator can then determine the possible causes of the malfunctioning of the connected device and prepare or select an appropriate patch for device recovery. The patch, along with the identification of the connected device to be patched, is uploaded to the operator device in a step 207. The patch initiator also creates a patch request PReq transaction which is signed by both the patch initiator and the operating device, i.e. both devices state that a patch from the patch initiator 101 is to be applied to the connected device 102. Beyond protection against repudiation provided by the signatures, the double signature allows the blockchain network miners which validate new transaction, to verify that the patch that will eventually be installed in the connected device by the operating device is the same as the one created by the patch initiator. In a step 208, the patch initiator sends a message to the blockchain network with the PReq transaction, transaction data, the identity of the connected device to be patched, and a hash value of the patch, signed by the patch initiator. The blockchain network acknowledges this message in a step 209. The operator device also sends a message for the PReq transaction to the blockchain network in a step 210. This message contains the transaction data, the identity of the connected device to be patched and the hash of the patch signed by the operator device. Again, the blockchain network acknowledges, in a step 211.

According to a variant exemplary embodiment, the PReq transaction is signed by both the patch initiator and the operator device before being sent to the blockchain network. E.g. the patch initiator may send the PReq it signed to the operator device, which signs and transmits to the blockchain network, or else sends the now multisigned transaction back to the patch initiator, which sends it to the blockchain network.

Once the multi-signature transaction is validated and accepted, the patch is sent to the connected device in a step 212. The operator device first connects to the connected device. This may be done e.g. through a direct wired connection to a serial port such as a USB connection, or a service port, or an ad hoc network connection. Once in communication with the connected device's software agent, the operator device transmits the patch to the connected device. The connected device 102 verifies the patch in a step 213. This may comprise checking the patch initiator's signature of the patch using an appropriate public key known to the connected device.

According to a variant embodiment, in case the connected device 102 is capable of connecting to the blockchain network 104, the verification of the patch may also comprise obtaining from the blockchain network the previously accepted PReq transaction and checking that the patch hash contained in the PReq transaction corresponds to the hash that the connected device 102 sent (step 'b' of the safety checks mentioned earlier).

Once the patch has been successfully verified, the connected device 102 deploys the patch.

According to an exemplary embodiment, the deployment of the patch may follow a similar process to the one already described in the frame of a two-device handshake, i.e. the creation of a second instance of the to-be-patched data and/or software, the application of the patch to one of the two instances, the verification of the correct application of the patch to the one instance and the subsequent deletion of the other instance. For reasons of clarity, this two-instance deployment process is not shown in FIGS. 2a and 2b.

A multisigned patch report PRep transaction is created to be added to the blockchain. The PRep contains transaction data, the identifier of the connected device and a hash of the patch results. This transaction is signed by both the connected device and the operator device to protect from repudiation (steps 214 and 215 respectively).

According to an exemplary embodiment, the patch report transaction PRep is initiated by the connected device 102.

According to an exemplary embodiment, the PRep transaction is signed by both the operator device and the connected device before being sent to the blockchain network, similarly to a variant embodiment mentioned for the PReq above.

According to an exemplary embodiment, the blockchain network validates and accepts the transaction if the following conditions are met:
  The PRep contains a valid pointer to the previously stored PReq ('Transaction Dependency Hash' in FIG. 4);
  The PRep and the PReq share the same patch hash, and the patch is signed by the same patch initiator and operator device;
  The PReq contains the identifier of the connected device that is also sending the PRep.

If the transaction is validated and accepted, the blockchain network issues acceptance acknowledgements to both the connected device and the operator device (steps 216 and 217 respectively). This acknowledgment furthermore guarantees to the connected device that the patch received from the operator device was the one created by the patch initiator.

At this point in time, the connected device has been patched and should have recovered its expected behavior.

In the exemplary embodiment using the double instance during the patching process, the connected device would now be using the patched instance. Should the patching fail for any reason at the level of the connected device, the latter would fall back on the non-patched instance.

According to an exemplary embodiment, in a step 218, once, the operator device has received the acknowledgement of the blockchain network, it sends a message to the patch initiator for notification of the completion of the patch process ('Operation report' message). The message contains in particular the identifier of the connected device.

According to an exemplary embodiment, in steps 219 to 222, once it has received the 'Operation report' message, the patch initiator obtains the latest status of the connected device from the blockchain network on one hand and from the connected device on the other. According to an exemplary embodiment, this information may be part of respective acknowledgment messages from the blockchain network and the connected device.

If both status information match, the patch initiator can conclude that the connected device operates correctly and that the patch has been successful.

Figure 3:
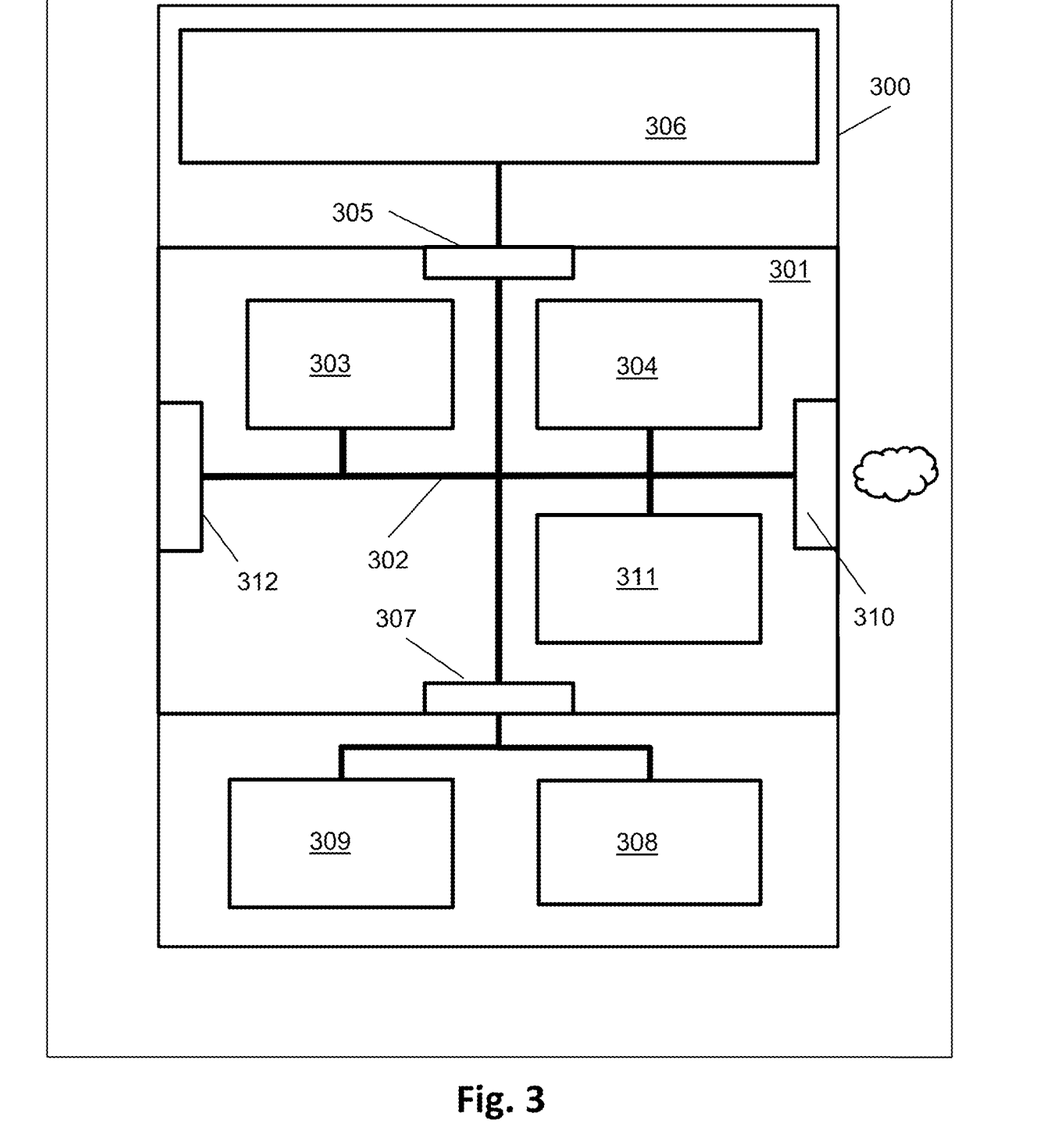
FIG. 3 is a block diagram of a device adapted to implement a method according to an exemplary embodiment.

FIG. 3 is a block diagram of a device 300 that, according to an exemplary embodiment, can be used to implement any one of the patch initiator 101, the connected device 102, the operator device 103 or one or more devices 105 from the blockchain network 104. The device 300 comprises a printed circuit board 301 on which a communication bus 302 connects a processor 303, a random access memory 304, a storage medium 311, an interface 305 for connecting a display 306, a series of connectors 307 for connecting user interface devices or modules such as a mouse or trackpad 308 and a keyboard 309, a wireless network interface 310 and a wired network interface 312. Depending on the functionality required, the patch initiator, the connected device or the operator device may implement only part of the above. Certain modules of FIG. 3 may be internal or connected externally, in which case they do not necessarily form integral part of the device itself. E.g. display 306 may be a display that is connected to a device only under specific circumstances, or the device may be controlled through another device with a display, i.e. no specific display 306 and interface 305 are required for such a device. For the network device 102, the storage medium 311 may contain an agent implemented in software code which, when executed by processor 303 for handling interaction with the blockchain network.

More generally, the storage medium 311 may contain software code which, when executed by processor 303, causes the device to carry out the methods described herein.

Figure 4:
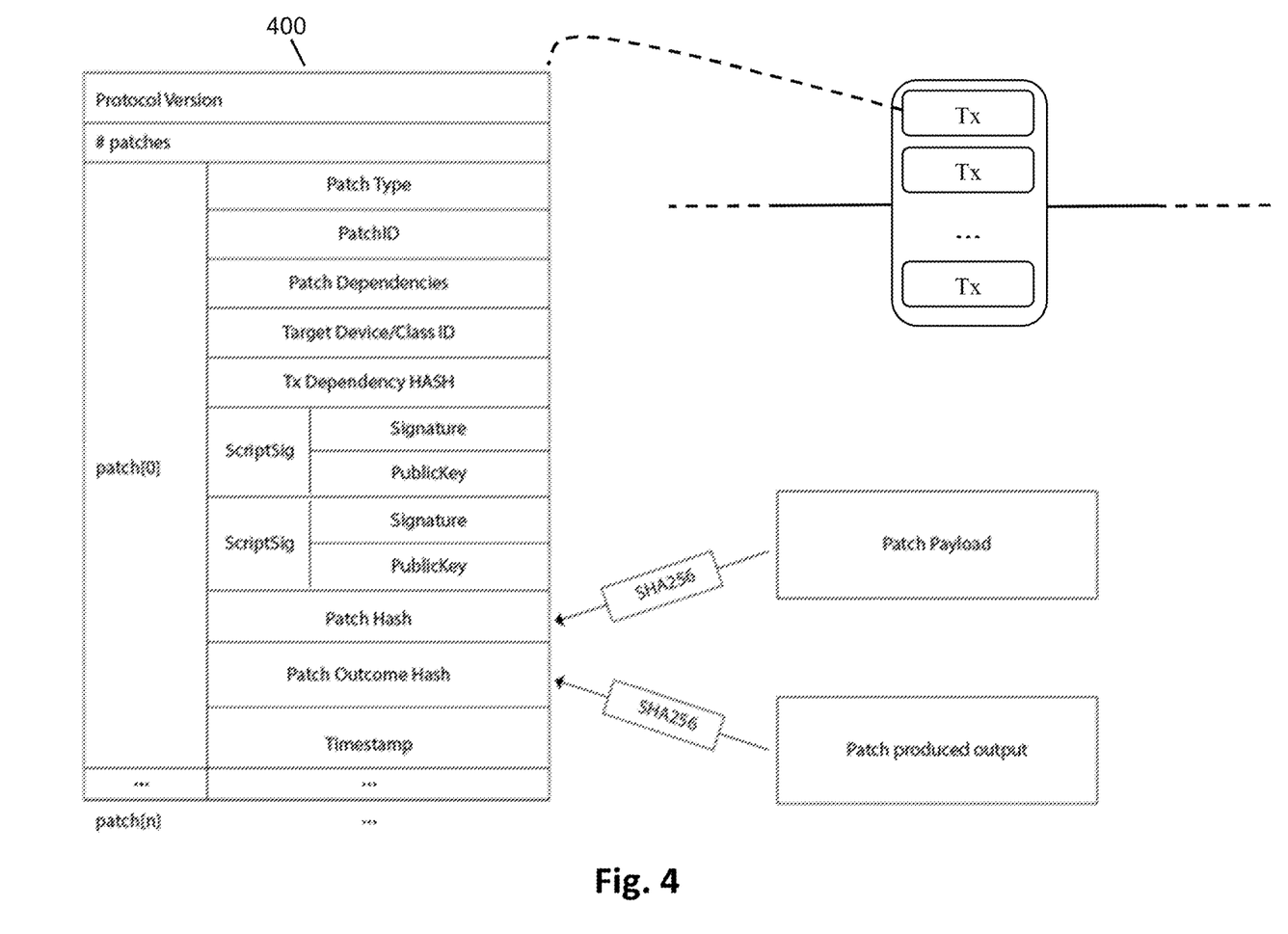
FIG. 4 is a block diagram illustrating a transaction record in a blockchain according to an exemplary embodiment.

FIG. 4 is a block diagram of a blockchain and an example of a transaction 400 for a multi-signed PReq patch request (or PRep patch report).

According to an exemplary embodiment, a transaction comprises:
  Protocol Version: the current protocol being used by the blockchain network,
  #Patches: the number of patches being provided within the transaction,
  patch[n]: patch number n in the transaction, patch [0] being the first patch,
  Patch Type: PReq or PRep,
  Patch ID: a unique identifier for patch [n],
  Patch Dependencies: zero or more prerequisite patches which need to be applied before patch[n] can be applied,
  Target Device/Class ID: used by the CD to identify patches within the blockchains,
  Transaction Dependency Hash: used to refer to other/previous Preq/Prep within the blockchain,
  ScriptSig[x]: signature components for signature by device 'x' of a multisig transaction,
  Signature[x]: signature of device 'x',
  PublicKey[x]: public key belonging to device 'x',
  There are as many ScriptSig records in a transaction as devices involved in the multisig transaction,
  Patch Hash: this is the hash of the patch payload generated by the patch initiator. The payload is not included within the transaction in clear text—it will be sent to the connected device and the operator device via offchain communication,
  Patch Outcome Hash: this hash is one of:
    For a PReq transaction, the hash provided by the patch initiator, based on the data descriptive of the list of operations to be executed within the connected device during application of the patch, i.e. the expected outcome of the patch,
    For a PRep transaction, the hash provided by the connected device, based on the data descriptive of the list of operations that were executed within the connected device during application of the patch, i.e. the actual outcome of the patch,
  Timestamp: time of creation of the transaction.

The above data structure is given as an example and contains detailed data that may not necessarily be useful or required for the implementation of an exemplary embodiment. The dependencies are one example.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. An apparatus for remotely controlling a network device, comprising:
   at least one processing core,
   at least one memory including computer program code,
   the at least one memory and the computer program code being configured to, with the at least one processing core, cause the apparatus at least to:
   determine that said network device is unresponsive;
   determine a patch for application at said network device for resolving said unresponsiveness;
   send, prior to sending said patch to an intermediary device, at least one status check operation to be carried out at said network device to said intermediary device;
   obtain, prior to sending said patch to said intermediary device, a result of said at least one status check operation from said intermediary device;
   send said patch to said intermediary device capable of communicating with said network device and providing said patch to said network device;
   sign a first transaction corresponding to said patch with a blockchain network, wherein said first transaction is a multi-signed transaction signed by said apparatus and said intermediary device and wherein said first transaction is indicative of a patch result to be obtained;
   receive a message from said intermediary device that the patch has been applied.

2. The apparatus according to claim 1, the first transaction further comprising:
   an identifier of said apparatus;
   an identifier of said intermediate device;
   an identifier of said network device;
   a hash of said patch;
   a hash of data descriptive of an expected outcome of said patch.

3. The apparatus according to the claim 1, is further caused to:
   obtain first status information of said network device from said blockchain network based on a second transaction linked to said first transaction;
   obtain second status information of said network device from said network device;
   determine a successful recovery when said first status and said second status information match.

4. A network device comprising:
   at least one processing core,
   at least one memory including computer program code,
   the at least one memory and the computer program code being configured to, with the at least one processing core, cause the network device at least to:
   obtain at least one status check operation from an intermediary device, carry out said at least one status check operation and report results of said at least one check operation to said intermediary device;
   receive a patch from said intermediary device, said patch having been received by said intermediary device from an apparatus configured to remotely control said network device, said network device being unresponsive to said apparatus;
   verify safety of said patch, and in case said patch is deemed safe, applying said patch;
   sign a second transaction corresponding to said patch with a blockchain network, wherein said second transaction is a multi-signed transaction signed by said network device and said intermediary device and wherein said second transaction comprises information indicative of a result of said patch application.

5. The network device according to claim 4, the second transaction further comprising:
   an identifier of an apparatus that provides the patch;
   an identifier of said intermediate device;
   an identifier of said network device;
   a hash of said patch;
   a hash of data descriptive of an actual outcome of said patch.

6. The network device according to claim 4, is further caused to;
   verify an identity of said intermediary device, by checking that said identity of said intermediary device stored in a first transaction stored in the blockchain linked to said second transaction is the same as the identity of said intermediary device said network device receives the patch from;
   verify that a hash of the patch received from said intermediary device is the same as a hash stored in said first transaction for that patch;
   verify that an own identity of said network device is the same as an identity of a device to be patched stored in said first transaction;
   verify whether an apparatus that provided the patch and indicated in the blockchain in said first transaction is a trusted device and/or whether the network device is allowed to receive a patch from said apparatus.

7. An intermediary device comprising
   at least one processing core,
   at least one memory including computer program code,
   the at least one memory and the computer program code being configured to, with the at least one processing core, cause the intermediary device at least to:
   obtain, from an apparatus, at least one status check operation to be carried out at a network device;
   collect status data from said network device corresponding to said at least one status check operation;
   provide said status data to said apparatus;
   receive a patch from said apparatus configured to remotely control said network device, said network device being unresponsive to said apparatus;
   sign a first transaction corresponding to said patch with a blockchain network, wherein said first transaction is a multi-signed transaction also signed by said apparatus and wherein said first transaction is indicative of a patch result to be obtained;
   provide said patch to said network device;
   sign a second transaction corresponding to said patch with a blockchain network, wherein said second transaction is a multi-signed transaction signed also by said network device and wherein said second transaction comprises information indicative of a result of patch application;
   provide, to the apparatus, a message indicative of the application of the patch.

* * * * *